United States Patent [19]

Greenberg

[11] Patent Number: 4,537,266

[45] Date of Patent: Aug. 27, 1985

[54] PORTABLE AND COMPACTIBLE SCALE

[76] Inventor: Mitchell H. Greenberg, 796 Sport Hill Rd., Easton, Conn. 06612

[21] Appl. No.: 567,032

[22] Filed: Dec. 30, 1983

[51] Int. Cl.³ .......................... G01G 5/04; G01G 21/00
[52] U.S. Cl. .................................... 177/208; 177/126;
177/254; 177/154; 73/862.58
[58] Field of Search ............... 177/126, 208, 209, 254,
177/154; 73/862.58, 146, 146.2, 146.3

[56] References Cited

U.S. PATENT DOCUMENTS

| | | | |
|---|---|---|---|
| 2,051,042 | 8/1936 | Hendel et al. | 73/146 |
| 2,954,221 | 9/1960 | Ernst | 73/862.58 X |
| 3,372,764 | 3/1968 | Crotts | 177/208 |
| 3,433,316 | 3/1969 | Newman | 177/208 |
| 3,774,704 | 11/1973 | Purcell | 177/126 |
| 4,002,216 | 1/1977 | Solow | 177/126 X |
| 4,085,810 | 4/1978 | Wellman | 177/209 |
| 4,089,036 | 5/1978 | Geronime | 361/283 |
| 4,370,697 | 1/1983 | Haberl et al. | 361/283 |
| 4,431,072 | 2/1984 | Stepp | 177/126 |

FOREIGN PATENT DOCUMENTS 2224797 11/1973 Fed. Rep. of Germany ...... 177/208

Primary Examiner—E. A. Goldberg
Assistant Examiner—Patrick W. Foster
Attorney, Agent, or Firm—Caesar, Rivise, Bernstein & Cohen, Ltd.

[57] ABSTRACT

A portable and compactible scale includes a flexible, compactible bladder providing an interior chamber in which a non-compressible fluid (e.g., hydraulic liquid) is retained. The bladder includes a top wall adapted to support the load to be weighed and spaced-apart support members extend downward from the top wall and terminate short of the bottom wall under no-load conditions. A plurality of spaced-apart, flexible, substantially non-stretchable tendon means optionally can be provided within the chamber to bridge the opposed top and bottom walls of the bladder and thereby impede outward bulging of the top wall during a weighing operation without inhibiting compressive deflection of the bladder.

8 Claims, 5 Drawing Figures

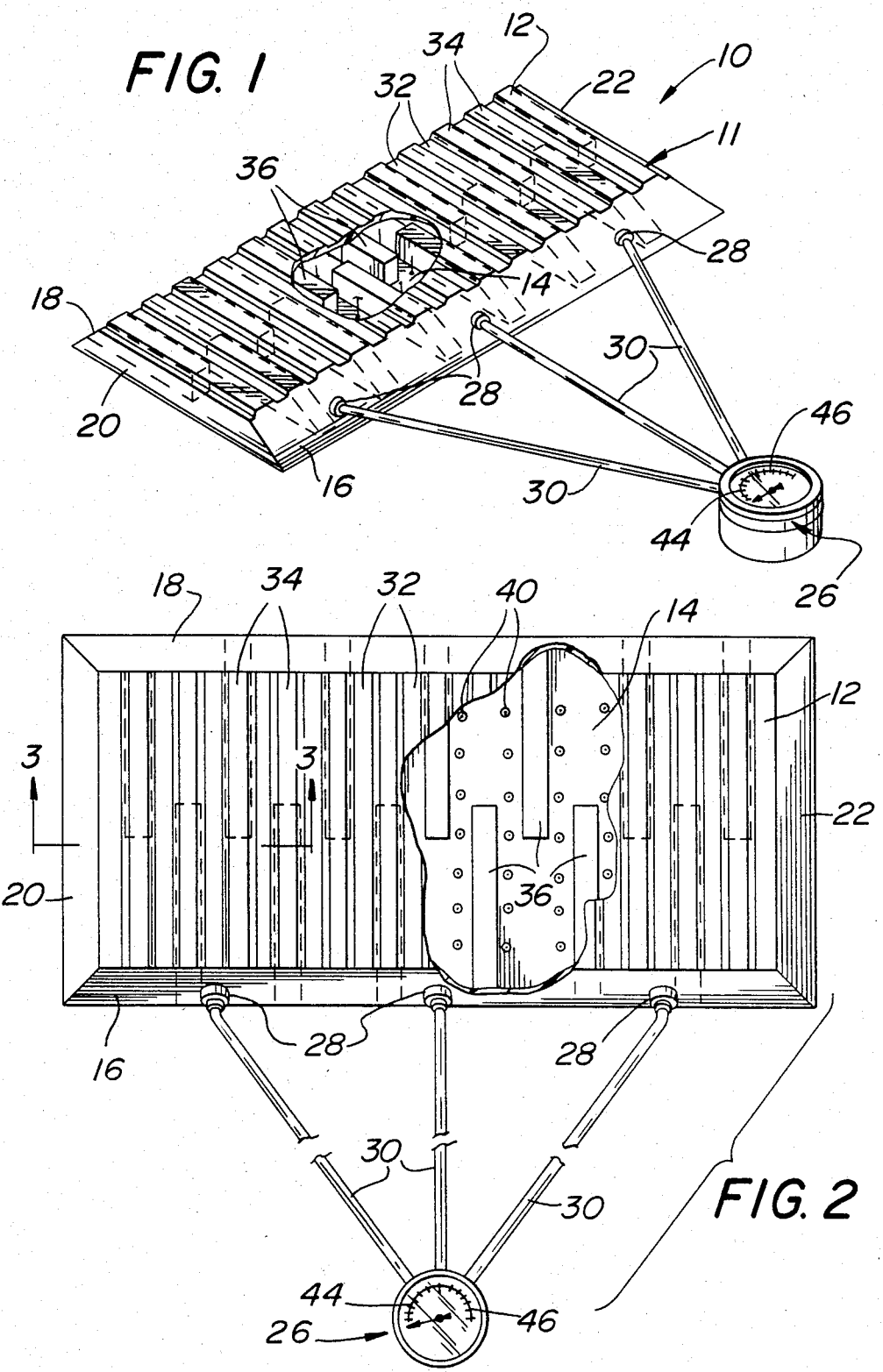

4,537,266

PORTABLE AND COMPACTIBLE SCALE

BACKGROUND OF THE INVENTION

This invention relates generally to a scale, and more specifically to a portable and compactible scale which is adapted to conform to irregular supporting surfaces and which can be easily compacted for storage or movement to a desired location of use.

In the veterinary field the weighing of animals is a common procedural step in their care and treatment. For example, it is quite common to weigh an animal preparatory to a surgical procedure, and for this purpose the veterinarian may actually want to weigh the animal on the surgery table. The veterinarian also may want to weigh an animal while it is recuperating from surgery, in which case it is highly desirable to provide the animal with a comfortable surface on which to rest while its weight is being recorded. In other words, for many applications it is highly desirable to provide a comfortable and conforming surface to support the animal while it is being weighed, as opposed to supporting the animal on a hard rigid surface. Moreover, since the scale may need to be transported between different areas of use or stored during periods of nonuse it is highly desirable that portability be built into the system.

A wide variety of portable scales have been disclosed in the prior art. For example, U.S. Pat. No. 3,372,764, issued to Crotts, discloses a portable hydraulic scale to be supported on an irregular ground surface for indicating the weight of heavy vehicles, such as trucks. In order to accomplish the weighing operation the scale is provided with a solid rigid top plate for supporting the tire of the vehicle.

U.S. Pat. No. 3,433,316, issued to Newman, discloses a pneumatically operated weighing device having a base and platform, each formed of a rigid material.

U.S. Pat. No. 3,774,704, issued to Purcell, discloses a portable livestock scale which is collapsed for transport to the location of use by removing various rigid components of the scale and folding the inclined, rigid ramps 16 into an inactive position.

Although various portable scale constructions are disclosed in the prior art, a need still is believed to exist for an improved scale construction adapted to conform to irregular supporting surfaces while providing a comfortable weighing surface upon which an animal to be weighed is supported and at the same time being readily compactible for storage or movement to a desired location of use.

OBJECTS OF THE INVENTION

It is a general object of this invention to provide a lightweight portable and compactible scale of an improved construction.

It is a further object of this invention to provide an imporved scale for use in the weighing of animals.

It is a further object of this invention to provide a portable, compactible scale construction for weighing both light and heavy loads.

It is a further object of this invention to provide a portable, compactible scale which is readily conformable to irregularly shaped supporting surfaces and which provides a nonbulging conformable top wall for supporting a load to be weighed.

SUMMARY OF THE INVENTION

The above and other objects of this invention are achieved in a portable and compactible scale formed of a flexible and compactible bladder that provides an interior chamber in which a non-compressible fluid is retained. The chamber includes a top wall for supporting the load to be weighed and an opposed bottom wall. In accordance with one aspect of the invention spaced-apart support members extend downwardly from the top wall and terminate short of the bottom wall under no-load conditions, and the top wall is more rigid in areas including the support members than in other areas thereof. In accordance with another aspect of the invention a plurality of spaced-apart, flexible, substantially non-stretchable tendon means bridge the inner surfaces of the opposed top and bottom bladder walls to impede outward bulging of the top wall when the top wall is exposed to a high internal pressure without inhibiting compressive deflection of the top wall during a weighing operation.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 1 is an isometric view of the portable and collapsible scale of this invention;

FIG. 2 is a plan view of the scale shown in FIG. 1;

DESCRIPTION OF THE PREFERRED EMBODIMENTS OF THE INVENTION

Figure 3:
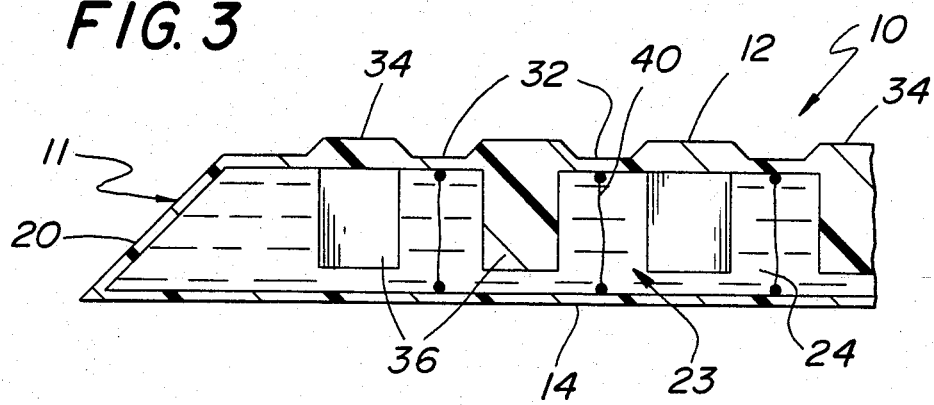
FIG. 3 is a fragmentary sectional view taken along line 3—3 of FIG. 2.

Referring now in greater detail to the various figures of the drawings wherein like reference characters refer to like parts, a portable and compactible scale embodying the present invention is generally shown at 10 in FIG. 1. This scale basically comprises a flexible mat or bladder 11 which is adapted to support a load to be weighed, and after removal of noncompressible liquid 24 from interior chamber 23 (FIG. 3) is capable of being rolled up into a compacted configuration, as is schematically illustrated in FIG. 4, for ease of storage or transport to a site of use. In actual practice the scale generally will be more tightly rolled then is shown in FIG. 4. Although the portable scale 10 of this invention has a wide variety of applications it is particularly well suited for use in the weighing of animals as is common in their examination and treatment by veterinarians.

Figure 4:
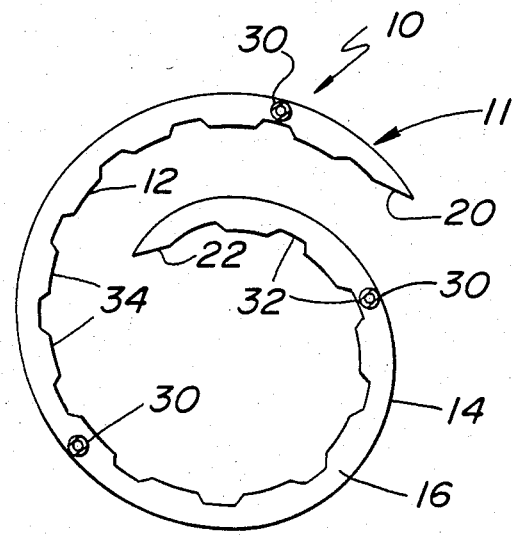
FIG. 4 is a side elevational view showing the manner in which the scale is rolled into a compacted condition for ease of storage or transport to a site of use.

Referring specifically to FIGS. 1–3 the flexible mat or bladder 11 of the scale 10 has a flexible, deformable top wall 12 adapted to support a load to be weighed and an oppsed flexible bottom wall 14 adapted to conform to irregular-shaped supporting surfaces. The bladder further includes inclined elongate side-walls 16 and 18 and shorter inclined end walls 20 and 22 bridging the top and bottom walls 12 and 14. Thus, the bladder 11 has a generally rectangular load-supporting top wall 12 of lesser transverse and elongate dimensions than the bottom wall 14.

The bladder can be made from a wide variety of different materials. However, the material must be fluid-impervious and should be capable of withstanding the high interior pressures imposed upon it without excessively stretching. Moreover, the material should be tough enough to resist cutting or tearing when placed on a rough surface, and yet flexible enough to permit deflection of the top wall under loading to provide an accurate measurement of the weight of the load.

For weighing heavy loads, such as large-sized animals, a steel-reinforced rubber can be employed, and in fact, can be of a construction similar to that employed in the manufacture of radial tires. Less rigidly reinforced constructions can be utilized for lighter loads, such as a rubber bladder provided with flexible fabric plies.

Referring specifically to FIG. 3 the various walls forming the bladder are sealed to provide the enclosed interior chamber 23 in which the free-flowing non-compressible liquid 24 is retained. This liquid can be of any conventional type capable of transmitting accurate load-bearing information to pressure gauge 26. In the most preferred embodiment a conventional synthetic hydraulic fluid under pressure can be employed.

As can be seen best in FIGS. 1 and 2 three fittings 28 are retained within the sidewall 16. These fittings surround normally closed, spring loaded valves (not shown) adapted to communicate the interior chamber 23 with the pressure gauge 26 through hydraulic lines 30. The hydraulic lines 30 bias the normally closed valves into an open condition when they are attached to the sidewall 16 through their respective fittings 28. Thus, attachment of the hydraulic lines 30 to the sidewall 16 communicates the enclosed chamber 23 of the bladder 11 with the pressure gauge 26. The pressure gauge is calibrated to weigh animals over a wide weight range, as will be explained in greater detail hereinafter.

As can be seen best in FIG. 2 the top wall 12 of the bladder 11 is a ridged construction defining a plurality of linear flexure regions or areas 32 interposed between thicker ridges 34. These flexure regions provide areas along which the bladder 11 can be rolled into a compactible construction, as is schematically illustrated in FIG. 3. Although the flexure regions preferably are linear other arrangements can be employed.

Prior to rolling up the bladder 11 the hydraulic lines 30 are separated from their respective fittings 28 and the hydraulic fluid 24 is drained from the chamber 23. In practice a vacuum device associated with a liquid retaining reservoir (not shown) can be secured to one of the fittings 28 to open the spring loaded valve and drain the enclosed chamber 23 of fluid 24. When the scale is to be reassembled for use the bladder 11 is unrolled and the hydraulic liquid is reintroduced into the chamber 23 through one or more of the valved openings. Thereafter the hydraulic lines 30 are reattached to the pressure gauge 26 and to the fittings 28 associated with the bladder 11. As explained earlier, attachment of the hydraulic lines to the bladder through the fittings 28 biases the normally closed spring loaded valves (not shown) into an open condition for communicating the interior chamber 23 of the bladder with the pessure gauge 26.

Referring to FIGS. 1-3 a unique aspect of this invention resides in the provision of a plurality of spaced-apart, load-bearing support members 36 extending downwardly from the inwardly facing surface of the top wall 12 and terminating short of the inwardly facing surface of the bottom wall 14 under no-load and light-load conditions. In an exemplary form of the invention the spacing between the inner surfaces of the top and bottom bladder walls 12 and 14 in the region between the support members 36 is approximately 1½ inches with the hydraulic fluid 24 in the chamber 23, and the support members 36 terminate approximately ¼ inch from the inner surface of the bottom bladder wall under no-load conditions.

The support members 36 preferably are in the form of elongate, compressible rubber bars adding rigidity to the top wall 12 in the areas in which they are located; however, other shapes and configurations of support members can be employed. These rubber bars are designed to be compressible for permitting heavy loads to be accurately measured in a manner to be described subsequently.

As can be seen best in FIGS. 1 and 2 the elongate bars 36 are spaced-apart adjacent each of the opposed sidewalls 16 and 18, and extend generally transverse to their respective sidewalls. The bars adjacent each sidewall terminate short of the opposed sidewall and are staggered in the elongate direction relative to the bars adjacent the opposed sidewall to thereby define a continuous serpentine flow path for the liquid 24, even when the lower surfaces of the bars 36 are pressed into engagement with the inner surface of the bottom wall 14. This arrangement contributes to the accuracy of the weighing operation by providing for uniform flow of the hydraulic liquid through each of the hydraulic lines 30 without excessive liquid pulsing.

It should be noted that the elongate bars 36 are located in regions of the ridges 34 of the top wall; not in the thinner flexure regions 32 along which the bladder 11 is adapted to be bent when it is being rolled up. As a result of this arrangement the compressible bars 36 will not interfere with or adversely effect the flexibility of the regions 32. Accordingly the bladder 11 can be rolled up easily from either of its opposed ends 20 or 22. Of course, as indicated earlier, the hydraulic lines 30 are separated from their respective interconnecting fittings 28 and the interior chamber 23 of the bladder is drained of the hydraulic liquid 24 prior to rolling up the bladder.

Referring to FIGS. 1-3 a plurality of spaced-apart, flexible, subsantially non-stretchable tendon means 40 may be located within the enclosed chamber 23 to bridge the opposed top and bottom walls 12 and 14 of the bladder if necessary to prevent bulging of the top wall during a weighing operation. In the embodiment illustrated in FIGS. 1 and 2 the tendon means 40 are in the form of non-stretchable threads made from nylon or other suitable material. These threads are adhered to the inner surfaces of the top and bottom bladder walls by any suitable binder that is compatible with both the composition of the threads and the composition of the bladder material.

Figure 5:
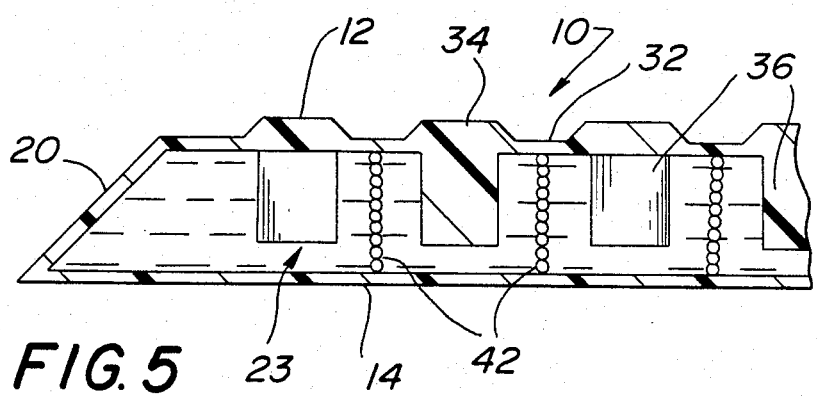
FIG. 5 is a fragmentary sectional view similar to FIG. 3 but showing an alternate form of the invention.

Referring to FIG. 5 an alternate arrangement of tendon means in indicated at 42, and is in the form of flexible chains perferably made from any suitable plastic or metal material. These chains are bonded to the inner surfaces of the top wall 12 and bottom wall 14 by any suitable binder compatible with both the material of the chain and the material of the bladder.

Both tendon means 40 and 42 preferably are located in the same positions within the bladder 11 and function in the same manner. Therefore only the arrangement and operation of the tendon means 40 will be described, it being understood that this same description is applicable to tendon means 42.

As can be seen best in FIGS. 1–3 the threads 40 preferably are adhered to the bladder in regions between the downwardly directed support members 36. In the preferred embodiment wherein the top wall 12 is ridged and the support members 36 are located only in the thick ridged regions 34 the threads 40 perferably are located only in the thin flexure regions 32.

In operation the pressure gauge 26 perferably is calibrated to measure light loads and heavy loads, as is indicated by calibrated scale portions 44 and 46. In particular, the scale portion 44 preferably is calibrated to weigh animals that are sufficiently light so as not to force the downwardly extending bars 36 into engagement with the bottom wall 14 of the bladder. The other scale portion 46 is calibrated for weighing heavier animals during which the downwardly directed bars 36 are compressed against the bottom wall 14. When weighing these heavier animals the bottom wall 14 of the scale preferably is supported on a rigid surface.

The location of the tendon means 40 in the thin flexure regions 32 can serve two important functions. First, due to their flexible nature they will not interfere or inhibit compressive deflection of the bladder top wall 12 during the weighing operation. In fact, since the tendon means are located out of alignment with the downwardly directed support members 36 they will not interfere with the weighing of heavy loads wherein the support members are compressed against the inner surface of the bottom wall 14. A second function of the tendon means is to assist in rigidifying the top wall 12 sufficiently to impede the outward bulging of the top wall 12 when the top wall is exposed to high internal pressures during a weighing operation.

From the above discussion it should be apparent that the present invention provides an extremely conformable structure which is easily adaptable to irregular supporting surfaces while providing a comfortable supporting top wall upon which an animal is placed for weighing. Moreover, in accordance with preferred aspects of this invention the scale is adapted to weigh both light and heavy loads while at the same time being easily compactible for either storage or transport to a site of use.

Without further elaboration the foregoing will so fully illustrate my invention that others may, by applying current or future knowledge, adopt the same for use under various conditions of service.

I claim:

1. A portable and compactible scale characterized by a flexible, compactible bladder providing an interior chamber, said bladder including a flexible top wall adapted to support a load to be weighed and a flexible bottom wall adapted to conform to a scale-supporting surface; a non-compressible fluid filling the closed chamber and spaced-apart compressible elongated support members extending along said top wall in a first direction and downwardly from the top wall each of said support members terminating short of the bottom wall under no-load conditions, said top wall being more rigid in areas including the support members than in other areas, said elongated members defining therebetween plural, spaced-apart, substantially parallel flexure regions extending in said first direction about which said scale can be bent to compact the scale.

2. The portable and compactible scale of claim 1 characterized in that the top wall of the bladder is provided with spaced-apart flexure regions between ridges, said flexure regions being thinner than said ridges and constituting regions along which the bladder is adapted to be bent to compact the scale.

3. The portable and compactible scale of claim 2 characterized by a plurality of spaced-apart, flexible, substantially non-stretchable tendon means bridging the interior chamber and adhered to inner surfaces of the opposed top and bottom walls in the flexure regions to impede outward bulging of the top wall when said top wall is exposed to high internal pressures without inhibiting compressive deflection of the bladder top wall during a weighing operation.

4. The portable and compactible scale of claim 1 characterized in that the top wall of the bladder has a lateral dimension defined between opposed, elongate sidewalls joining said top wall, said spaced-apart support members being in the form of compressible bars spaced-apart adjacent each of the opposed side walls and extending generally transverse to their respective side walls, the bars adjacent each side wall terminating short of the opposed sidewall and being staggered in the elongate direction relative to the bars adjacent the opposed sidewall to define a continuous serpentine flow path for the fluid in the interior chamber.

5. The portable and compactible scale of claim 4 characterized in that the bladder is compactible by being rolled up from an end thereof in a direction generally perpendicular to the direction in which the compressible bars extend.

6. The portable and compatible scale of claim 1 characterized in that the bladder is compactible by being capable of being rolled up from an end thereof.

7. The portable and compactible scale of claim 1 characterized in that the spaced-apart support members extend downwardly from the top wall in an arrangement for maintaining the continuity of the fluid-containing interior chamber when a load to be weighed is applied to the top wall for forcing lower surfaces of the support members into engagement with the bottom wall of the bladder.

8. The portable and compactible scale of claim 1 characterized by a plurality of spaced-apart, flexible, substantially non-stretchable tendon means bridging the interior chamber and adhered to inner surfaces of the opposed top and bottom walls in the flexure regions to impede outward bulging of the top wall when said top wall is exposed to high internal pressures without inhibiting compressive deflection of the bladder top wall during a weighing operation.

* * * * *